UNITED STATES PATENT OFFICE.

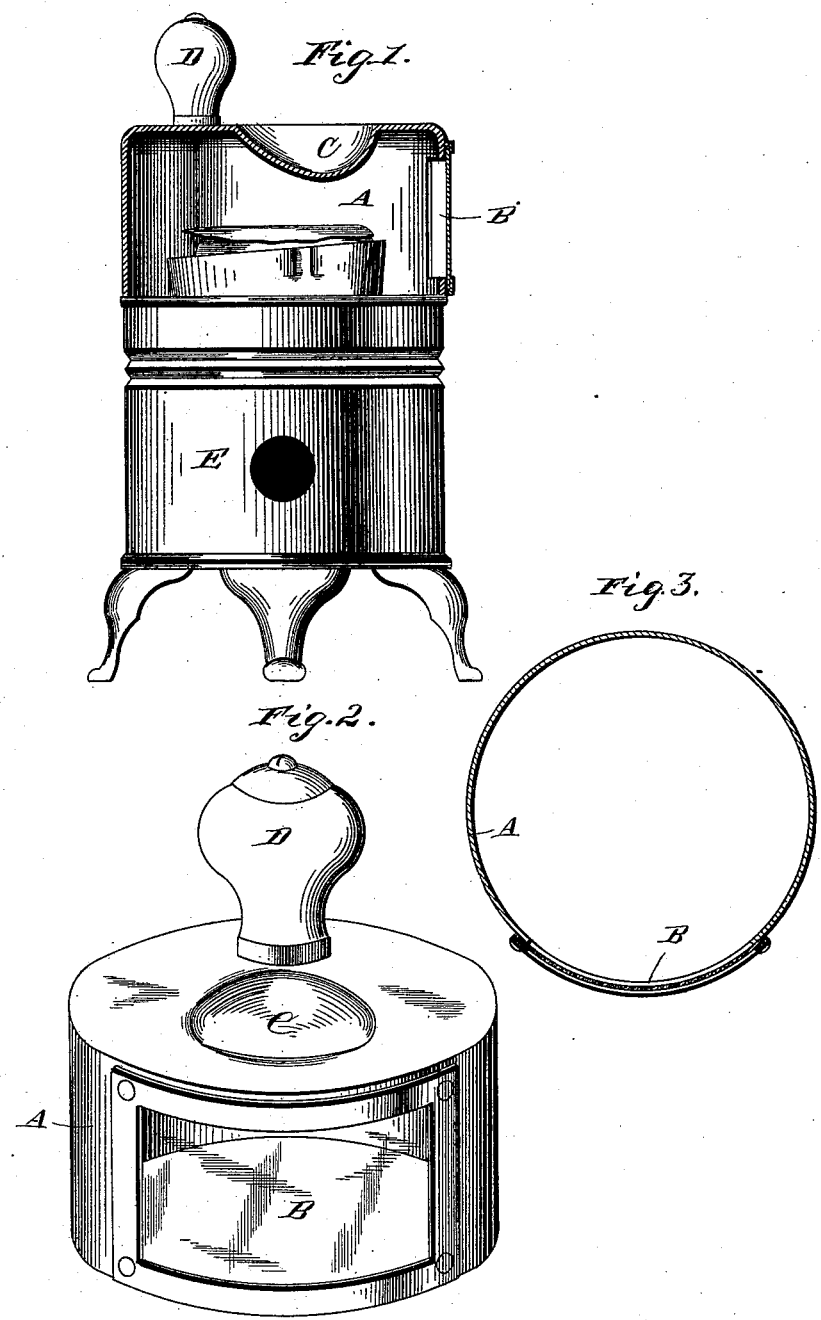

ROLLA MINER CHASE, OF BETHEL, VERMONT.

HEATER FOR DENTAL FLASKS.

SPECIFICATION forming part of Letters Patent No. 384,509, dated June 12, 1888.

Application filed December 23, 1886. Serial No. 222,412. (No model.)

*To all whom it may concern:*

Be it known that I, ROLLA MINER CHASE, a citizen of the United States, residing at Bethel, in the county of Windsor and State of Vermont, have invented a new and useful Improvement in Heaters for Dental Flasks, of which the following is a specification.

My invention relates to an improvement in heaters for dental flasks; and it consists in a metallic or other suitable conducting-cover adapted to be placed over the dental flask so as to surround the same and reflect the heat thereupon in order to soften the rubber in the flask and render it plastic, and thereby facilitate the manipulation of the rubber when making the plate and attaching the teeth thereto.

In the accompanying drawings, Figure 1 is a vertical sectional view of my invention arranged over a spirit-lamp, and showing the lower half of the flask containing the model in position within the heater. Fig. 2 is a perspective view of my heater. Fig. 3 is a horizontal section.

A represents a circular heater, which is made of brass or other suitable heat-conducting material, and has its bottom open, the top and sides of the heater being closed, as shown. In one side of the heater is an opening, B, which is covered by a sheet of mica or other suitable transparent material to prevent the escape of heat from the heater and at the same time expose the flask in the heater to observation.

In the top of the heater is made a concavo-convex depending offset, C, the general shape of which corresponds to the palatal or lingual surface of the model in the lower half of the flask.

Attached to the top of the heater, near one side thereof, is a knob, D, which forms a handle by which the heater may be grasped and either removed from over the flask or placed in position over the same.

My invention is designed for use in making rubber plates for false teeth, and I proceed in the following manner: When the case is ready to pack, I cut strips of rubber and lay them around the outside of the model, pressing them gently together with the fingers, or preferably with an old excavator, until a sufficient quantity of rubber has been placed on the model. During this operation the heater A is placed over a spirit-lamp—such as shown at E in Fig. 1—or other suitable source of heat, and becomes heated thereby. After a suitable quantity of rubber is placed upon the model, the flask, with the model and rubber, is placed on the spirit-lamp, and the heater A is placed over the flask so as to cover the same, as shown in Fig. 1. The sides, top, and offset of the heater confine the heat as it rises from the lamp and reflect the same down upon the model and rubber in the flask, so as to heat the rubber and model to a uniform temperature and thoroughly soften the rubber and render it plastic. By looking through the mica-covered opening in the heater the operator can readily ascertain when the rubber is sufficiently softened. The heater and lower half of the flask are then removed from the spirit-lamp. A thin sheet of rubber previously wet with water is placed over the rubber on the model, the upper half of the flask, containing the plaster in which the teeth are embedded, is placed in position on the lower half thereof, and the two parts of the flask are then pressed together. The flask is then opened, the rubber dam removed, and if a sufficient quantity of rubber has been used the rubber will be found to have assumed a perfect shape on the model.

In the event that too much rubber has been used, the flask will not close readily, and part of the rubber must be removed. If there is a deficiency of rubber on the model, more must be applied and heated as before.

Assuming that there is just a sufficient quantity of rubber on the model, after the rubber dam is removed the case is ready for closing, and is then placed in the vulcanizer.

The rubber dam prevents the rubber on the model from adhering to the upper half of the flask and the pins of the teeth until final closing, thus enabling the dentist to get the exact quantity of rubber on the model necessary to make a perfect plate.

It is to be understood that I lay especial stress on the construction of a dome-shaped device which is of sufficient height to cover and surround a dental flask, whereby the heat arising from the source of heat will be confined and retained within the dome-shaped device or cover, and then be reflected in an increased degree upon the flask. For the purposes of securing the best results the cover should be made of brass or other metal that would properly reflect the heat upon the flask.

Having thus described my invention, I claim—

1. A heater for dental flasks adapted to inclose and cover the flask, and having at its upper side the depending offset C, corresponding in general shape to the palatal or lingual surface of the model in the lower half of the flask, substantially as described.

2. The heater for dental flasks having the offset C, for the purpose set forth.

In testimony that I claim the foregoing as my own I have hereto affixed my signature in presence of two witnesses.

ROLLA MINER CHASE.

Witnesses:
FRED ARNOLD,
GUY WILSON.